C. MOTZ.
ELASTIC VEHICLE TIRE.
APPLICATION FILED JULY 31, 1908.
925,937.
Patented June 22, 1909.
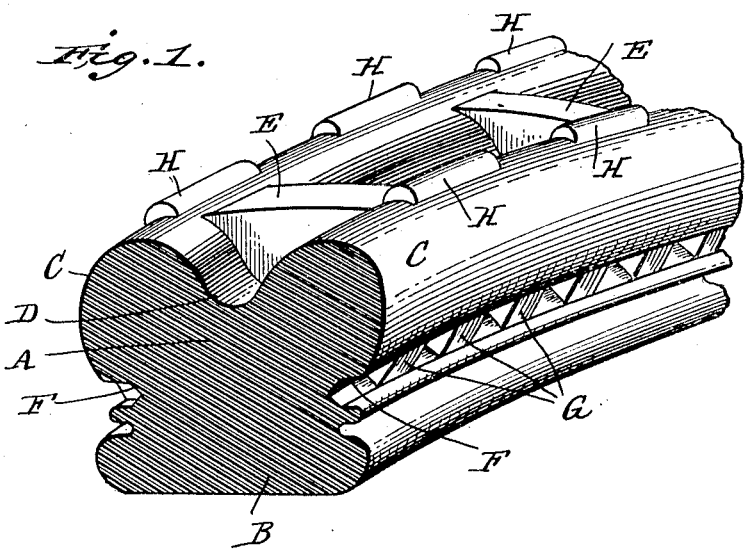
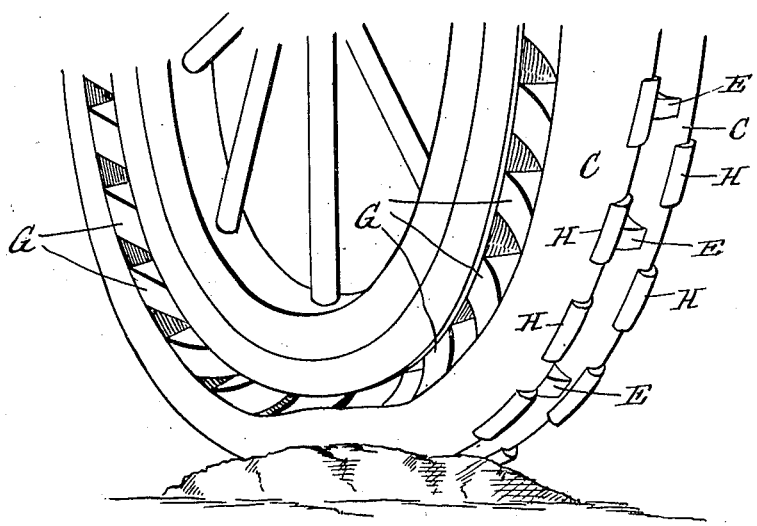

UNITED STATES PATENT OFFICE.

CHARLES MOTZ, OF AKRON, OHIO.

ELASTIC VEHICLE-TIRE.

No. 925,937.　　　　Specification of Letters Patent.　　　Patented June 22, 1909.

Application filed July 31, 1908. Serial No. 446,328.

To all whom it may concern:

Be it known that I, CHARLES MOTZ, a citizen of the United States, residing at Akron, in the county of Summit and State of Ohio, have invented certain new and useful Improvements in Elastic Vehicle-Tires; and I do hereby declare the following to be a full, clear, and exact description of the same, reference being had to the accompanying drawings, forming a part of this specification, and to the letters of reference marked thereon.

This invention relates to elastic vehicle tires and has for its object to provide a solid rubber or elastic tire that shall be of increased resiliency, have increased road traction and will not be liable to skid or slip.

To these ends the invention consists in certain novel details of construction and combinations and arrangements of parts all as will be hereinafter described and the particular features of novelty pointed out in the appended claims.

In the accompanying drawings, wherein I have illustrated the preferred embodiment of the invention; Figure 1 is a perspective view of a section of a tire embodying the improvements. Fig. 2 is a perspective view of a vehicle wheel equipped with a tire, showing the manner in which the tire yields or bends when meeting an obstruction.

Similar letters of reference in the several figures indicate the same parts.

The tire illustrated is one adapted for use with what is known as a clencher rim, but any preferred or usual base foundation may be employed. The body portion of the tire is indicated by the letter A and the portion to be confined in the rim by the letter B.

The tread of the tire is formed by laterally extending portions C, between which, and centrally of the tire, is a valley or depression D. These lateral extensions are preferably made convex transversely, that is they arch outwardly. With this construction it will be noted that the extensions may be spread widely to form a very wide tire, thereby giving a large gripping surface, but in order to still further increase their gripping effect, I preferably employ a plurality of cross webs or bridging pieces E, located at intervals within the valley or depression D, as shown clearly in Fig. 1.

In order to prolong the life of the tire and also to insure its gripping the road surface, the tread portions C of the tire are each provided with raised portions or beads H, preferably formed integral with the tire, placed at intervals around the periphery thereof, the beads on one tread portion being opposite the space between the beads on the other tread portion. These beads may be of any desired shape, but, as shown, they are substantially semi-cylindrical in cross section and are elongated in the direction of the length of the tread.

In order to increase the resiliency of the tire the laterally extending portions C are undercut, as at F, and the extensions are supported by a plurality of inclined webs G. By having these webs inclined when the tire is under pressure, they bend and flatten, as shown in Fig. 2, so that although they may be made thick to insure strength, their resilient effect will not be destroyed. By inclining the webs G, it has been found that the disintegration of the rubber is to a great degree eliminated, and a greater range of flexibility secured.

Having thus described my invention, what I claim as new and desire to secure by Letters Patent, is:

1. As a new article of manufacture, a solid rubber tire having two symmetrical tread portions separated by a central circumferential groove, and transverse bridge pieces or webs within said groove.

2. As a new article of manufacture, a solid rubber tire having undercut sides stayed at short intervals by a plurality of inclined webs, and two symmetrical convex tread portions separated by a deep circumferential groove, said tread portions overlying the undercut portions and webs at the side.

3. As a new article of manufacture, a solid rubber tire having undercut sides stayed at intervals by a plurality of inclined webs, and two symmetrical convex tread portions separated by a deep circumferential groove, a plurality of bridge pieces or webs extending across said groove at short intervals, said tread portions overlying the undercut portions of the sides.

4. As a new article of manufacture a solid rubber tire having two symmetrical tread portions separated by a central circumferential groove; transverse bridges within said groove and a plurality of beads or raised portion on the said treads.

5. As a new article of manufacture, a solid rubber tire having undercut sides stayed at short intervals by a plurality of inclined webs.

CHARLES MOTZ.

Witnesses:
ADELINE N. HOOVER,
PAUL E. BERTSCH.